US010232513B2

(12) United States Patent
Naitou et al.

(10) Patent No.: US 10,232,513 B2
(45) Date of Patent: Mar. 19, 2019

(54) ROBOT CONTROL DEVICE, ROBOT SYSTEM AND METHOD OF CONTROLLING ROBOT WHICH CARRIES OBJECT IN COOPERATION WITH PERSON

(71) Applicant: FANUC CORPORATION, Yamanashi (JP)

(72) Inventors: Yasuhiro Naitou, Yamanashi (JP); Soichi Arita, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 154 days.

(21) Appl. No.: 15/292,119

(22) Filed: Oct. 13, 2016

(65) Prior Publication Data

US 2017/0106541 A1    Apr. 20, 2017

(30) Foreign Application Priority Data

Oct. 16, 2015   (JP) .................................. 2015-204942

(51) Int. Cl.
| | |
|---|---|
| *G06F 19/00* | (2018.01) |
| *B25J 13/08* | (2006.01) |
| *B25J 9/06* | (2006.01) |
| *B25J 9/16* | (2006.01) |
| *B25J 19/00* | (2006.01) |

(52) U.S. Cl.
CPC ............... *B25J 13/085* (2013.01); *B25J 9/06* (2013.01); *B25J 9/1674* (2013.01); *B25J 19/0004* (2013.01)

(58) Field of Classification Search
CPC . B25J 13/085; B25J 9/06; B25J 9/1674; B25J 19/0004
USPC .................................................. 700/245, 256
See application file for complete search history.

(56) References Cited

U.S. PATENT DOCUMENTS

| | | | | |
|---|---|---|---|---|
| 7,439,951 | B2 * | 10/2008 | Rosenberg | .............. A63F 13/06 345/156 |
| 2003/0056561 | A1 * | 3/2003 | Butscher | .................. A61C 7/04 72/295 |
| 2004/0128030 | A1 * | 7/2004 | Nagata | .................. B25J 9/1633 700/245 |
| 2006/0071625 | A1 * | 4/2006 | Nakata | .................. B25J 9/1633 318/568.12 |

(Continued)

FOREIGN PATENT DOCUMENTS

| | | |
|---|---|---|
| JP | 6-218685 A | 8/1994 |
| JP | 7-256577 A | 10/1995 |

(Continued)

*Primary Examiner* — Ronnie M Mancho
(74) *Attorney, Agent, or Firm* — Hauptman Ham, LLP

(57) ABSTRACT

There is provided a robot control device enabling a robot to carry various types of objects without exceeding an allowable weight thereof. The robot control device for controlling the robot for carrying an object in cooperation with a person includes a force acquisition part configured to acquire force applied from the object to the robot when the object is lifted, a comparison part configured to compare a force component in a gravity direction of the force acquired by the force acquisition part with a first threshold value predetermined with respect to the force component, and a stop command part configured to stop the robot when the force component is greater than the first threshold value.

12 Claims, 9 Drawing Sheets

(56) References Cited

U.S. PATENT DOCUMENTS

| | | | | |
|---|---|---|---|---|
| 2006/0293617 | A1* | 12/2006 | Einav | A61H 1/0274 |
| | | | | 601/33 |
| 2009/0069942 | A1* | 3/2009 | Takahashi | B25J 9/1633 |
| | | | | 700/260 |
| 2009/0197217 | A1* | 8/2009 | Butscher | A61K 31/198 |
| | | | | 433/20 |
| 2010/0256812 | A1* | 10/2010 | Tsusaka | A47L 9/24 |
| | | | | 700/254 |
| 2011/0208355 | A1* | 8/2011 | Tsusaka | B25J 9/1664 |
| | | | | 700/246 |
| 2013/0282178 | A1 | 10/2013 | Freitag et al. | |
| 2014/0107843 | A1 | 4/2014 | Okazaki | |
| 2014/0230581 | A1* | 8/2014 | Nakatani | G01L 5/009 |
| | | | | 73/865 |
| 2014/0316572 | A1* | 10/2014 | Iwatake | B25J 9/1633 |
| | | | | 700/258 |
| 2015/0224639 | A1* | 8/2015 | Dockter | B25J 3/04 |
| | | | | 700/264 |

FOREIGN PATENT DOCUMENTS

| | | |
|---|---|---|
| JP | 8-185218 A | 7/1996 |
| JP | H11-309184 A | 11/1999 |
| JP | 2000-176872 A | 6/2000 |
| JP | 2000-343470 A | 12/2000 |
| JP | 2005-34960 A | 2/2005 |
| JP | 2006-167837 A | 6/2006 |
| JP | 2007-98501 A | 4/2007 |
| JP | 2008-188722 A | 8/2008 |
| JP | 4445038 B2 | 4/2010 |
| JP | 2015-157352 A | 9/2015 |
| WO | 2013/175777 A1 | 11/2013 |
| WO | 2014/126112 A1 | 8/2014 |

* cited by examiner

ROBOT CONTROL DEVICE, ROBOT SYSTEM AND METHOD OF CONTROLLING ROBOT WHICH CARRIES OBJECT IN COOPERATION WITH PERSON

RELATED APPLICATIONS

The present application claims priority to Japanese Patent Application Number 2015-204942 filed Oct. 16, 2015, the disclosure of which is hereby incorporated by reference herein in its entirety.

BACKGROUND OF THE INVENTION

1. Field of the Invention

The invention relates to a robot control device for controlling a robot for carrying an object in cooperation with a person, a robot system, and a method therefor.

2. Description of the Related Art

Robot systems in which robots carry objects in cooperation with persons have been known (for example, Japanese Laid-open Patent Publication No. 2000-176872, Japanese Laid-open Patent Publication No. 2000-343470, and Japanese Patent No. 4445038).

In general, an allowable weight of an object that a robot can carry is determined for each robot. In the present technical field, a technique for enabling a robot to carry various types of objects without exceeding the allowable weight of the robot is desired.

SUMMARY OF INVENTION

According to an aspect of the invention, a robot control device which controls a robot which carries an object in cooperation with a person, comprises a force acquisition part configured to acquire a force applied from the object to the robot when the robot lifts up the object, a comparison part configured to compare a force component in a gravity direction of the force acquired by the force acquisition part with a first threshold value predetermined with respect to the force component, and a stop command part configured to stop the robot when the force component is greater than the first threshold value.

The robot control device may further comprise an operation command part configured to generate an operation command to the robot for carrying the object when the force component is smaller than or equal to the first threshold value, and transmit the operation command to the robot.

The operation command part may generate the operation command for carrying the object in a direction opposite to the gravity direction, when the force component is smaller than or equal to a second threshold value which is smaller than the first threshold value.

The operation command part may generate the operation command for carrying the object in the gravity direction, when the force component is smaller than or equal to the first threshold value and is greater than or equal to a second threshold value which is smaller than the first threshold value.

The stop command part may stop the robot when the force component is smaller than a second threshold value which is smaller than the first threshold value. The operation command part may generate the operation command for carrying the object in a direction intersecting with the gravity direction, in response to a force component in the direction intersecting with the gravity direction of the force acquired by the force acquisition part.

The stop command part may stop the robot when the force component in a horizontal direction of the force acquired by the force acquisition part is greater than a threshold value predetermined with respect to the force component in the horizontal direction.

In another aspect of the invention, a robot system comprises a robot and the above-mentioned robot control device configured to control the robot. The robot includes a force detection part configured to detect a force applied from the object to the robot when the robot lifts up the object.

In still another aspect of the invention, a method of controlling a robot which carries an object in cooperation with a person, comprises steps of detecting a force applied from the object to the robot when the robot lifts up the object, comparing a force component in a gravity direction of the detected force with a threshold value predetermined with respect to the force component, and stopping the robot when the force component is greater than the threshold value.

BRIEF DESCRIPTION OF THE DRAWINGS

The above-described or other objects, features, and advantages of the invention will be clarified by the following description of embodiments of the invention with reference to the attached drawings, in which.

DETAILED DESCRIPTION

Figure 1:
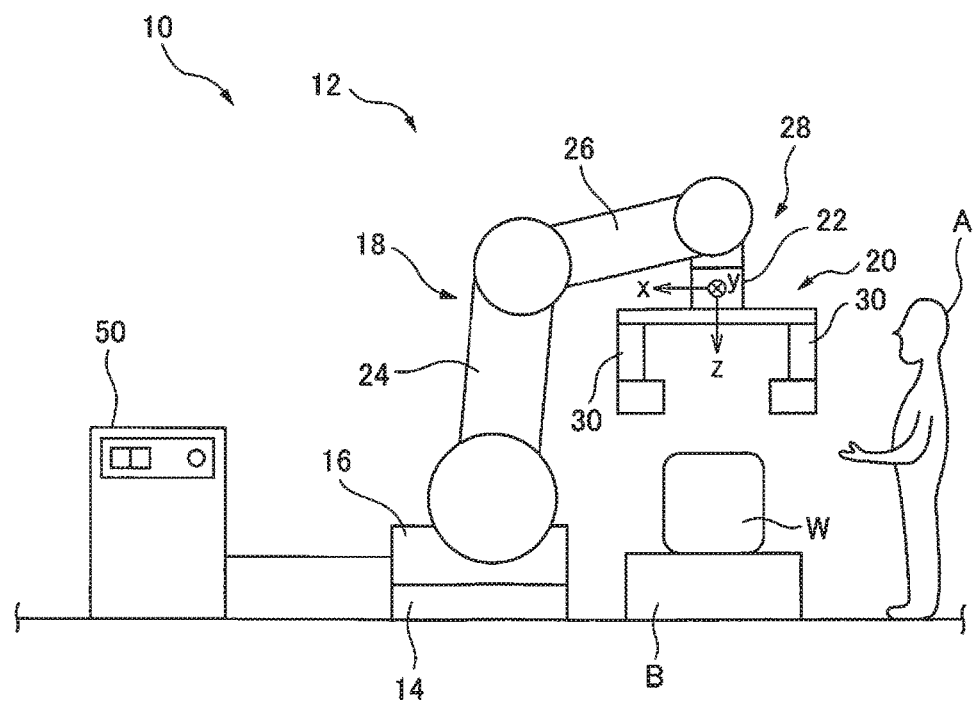
FIG. 1 is a view of a robot system according to an embodiment of the invention.

Embodiments of the invention will be described in detail below with reference to the drawings. First, with reference to FIG. 1 and FIG. 2, a robot system 10 according to an embodiment of the invention will be described. The robot system 10 is for carrying a workpiece W as an object in cooperation with a worker A.

The robot system 10 includes a robot 12 and a robot control device 50 which controls the robot 12. The robot 12 is e.g. a vertical articulated robot, and includes a robot base 14, a revolving drum 16, a robot arm 18, a robot hand 20, and a force detection part 22.

The robot base 14 is fixed on a floor of a work cell. The revolving drum 16 is attached to the robot base 14 so as to be rotatable about a vertical axis. The robot arm 18 includes an upper arm 24 rotatably attached to the revolving body 16, and a forearm 26 rotatably attached to a distal end of the upper arm 24.

The robot hand 20 is attached to a distal end of the forearm 26 via a wrist 28. The robot hand 20 includes a plurality of fingers 30 able to open and close so as to grip and release the workpiece W.

The force detection part 22 is mounted at the wrist part 28. In this embodiment, the force detection part 22 includes a 6-axis force sensor, and can detect loads in the x-axis, the y-axis, and the z-axis directions in FIG. 1 and moments about the x-axis, the y-axis, and the z-axis, for example. The force detection part 22 sends data of the detected force (i.e., the loads and the moments) to the robot control device 50.

Figure 2:
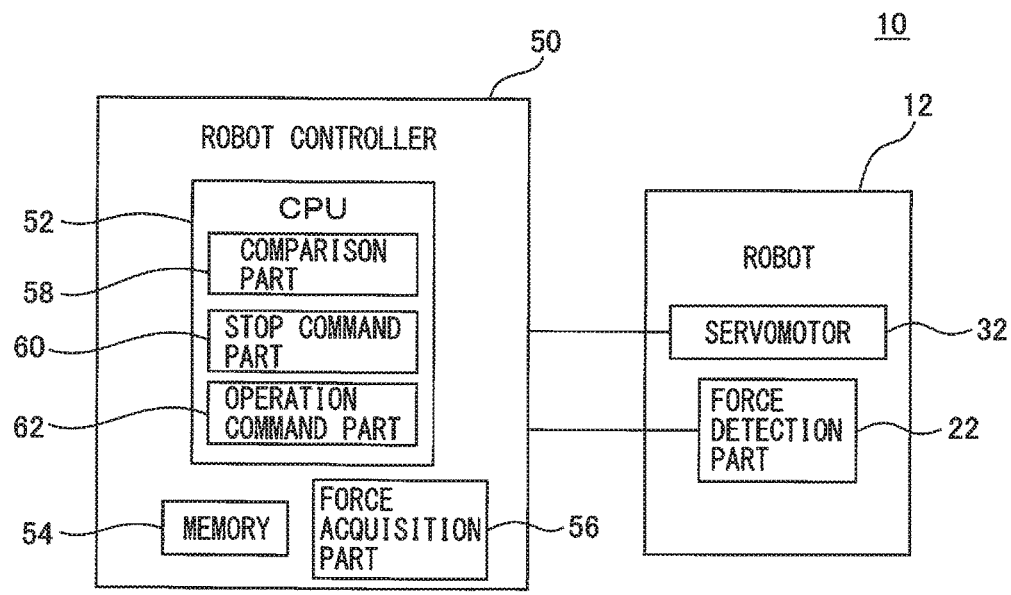
FIG. 2 is a block diagram of the robot system shown in FIG. 1.

As shown in FIG. 2, the robot 12 includes a plurality of servomotors 32. The servomotors 32 are built in the revolving drum 16, the robot arm 18, the wrist 28, and the robot hand 20, and moves these elements in response to a command from the robot control device 50.

The robot control device 50 includes a central processing unit (CPU) 52, a memory 54, and a force acquisition part 56. The memory 54 and the force acquisition part 56 are connected to the CPU 52 via a bus.

The memory 54 is comprised of e.g. an electrically erasable and recordable nonvolatile memory, such as EEPROM (registered trademark), or a random access memory, such as a DRAM or SRAM, which can be read out and written on data at high speed. The memory 54 records a constant, a variable, a robot program or the like, which are necessary for operating the robot 12.

The force acquisition part 56 includes e.g. an A/D converter, and receives data of force sent from the force detection part 22. The CPU 52 records the data of force acquired by the force acquisition part 56 in the memory 54.

In this embodiment, the CPU 52 functions as a comparison part 58, a stop command part 60, and an operation command part 62. The functions of the comparison part 58, the stop command part 60, and the operation command part 62 will be described later.

Figure 3:
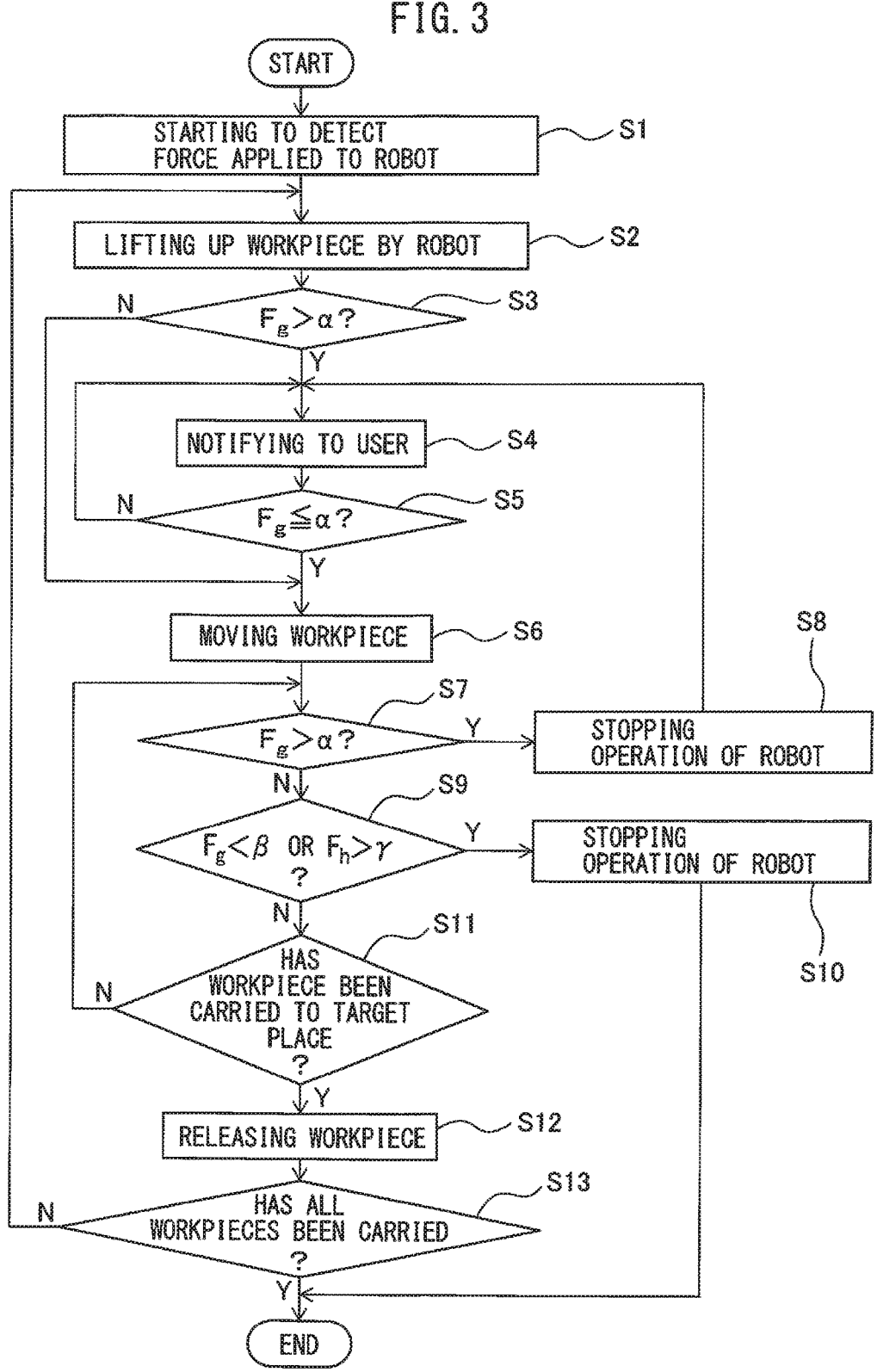
FIG. 3 is a flow chart of an example of an operation flow of the robot system shown in FIG. 1.

Next, with reference to FIG. 3 to FIG. 10, an embodiment of an operation flow of the robot system 10 will be described. The flow shown in FIG. 3 is started when the CPU 52 receives a command for carrying the workpiece W from a user, host controller, program or the like.

At step S1, the CPU 52 starts to detect force applied to the robot 12. Specifically, the CPU 52 sends a force detection command to the force detection part 22. When receiving the force detection command, the force detection part 22 periodically detects force (i.e., loads in the x-axis, the y-axis and the z-axis directions and moments around the x-axis, the y-axis and the z-axis), which acts on a portion where the force detection part 22 is mounted, with a period τ (e.g., one second).

The force detection part 22 sends data of the detected force to the robot control device 50. The force acquisition part 56 periodically receives the data of the force from the force detection part 22 with the period τ. The CPU 52 successively records the data of the force acquired by the force acquisition part 56 in the memory 54.

At step S2, the CPU 52 operates the robot 12 so as to lift up the workpiece W. Specifically, the CPU 52 sends commands to the servomotors 32 built in the robot 12 so as to grip the workpiece W placed on a predetermined place B (FIG. 1) and lift up it.

The robot 12 according to this embodiment carries various types of the workpieces W having various weights, in cooperation with a worker. An allowable weight of an object to be carried by the robot 12 is predetermined. If the robot 12 carries the workpiece W heavier than the allowable weight, it is possible that the robot 12 breaks down.

In order to avoid such a situation, the robot system 10 according to this embodiment determines whether a load exceeding the allowable weight is applied to the robot 12 when the robot 12 lifts up the workpiece W at step S2.

At step S3, the CPU 52 determines whether a force component $F_g$ in the gravity direction of a force F applied from the workpiece W to the robot 12 when the robot 12 lifts up the workpiece W at step S2 is greater than a predetermined threshold value α.

Specifically, the CPU 52 calculates the force component $F_g$, which acts in the gravity direction, of the force F applied from the workpiece W to the robot hand 20, from data of the force most-recently acquired by the force acquisition part 56.

The force component $F_g$ is a force applied to the robot hand 20 due to the weight of the workpiece W when the robot hand 20 lifts the workpiece W, and includes e.g. a load in the gravity direction or a moment about the horizontal axis.

The CPU 52 compares the calculated force component $F_g$ with the threshold value α (first threshold value) which is predetermined with respect to the force component $F_g$. When the force component $F_g$ is greater than the threshold value α, the CPU 52 determines "YES", and proceeds to step S4. On the other hand, when the force component $F_g$ is smaller than or equal to the threshold value α, the CPU 52 determines "NO", and proceeds to step S6.

Thus, in this embodiment, the CPU 52 functions as the comparison part 58 which compares the force component $F_g$ with the threshold value α. The threshold value α is determined so as to be correlated with the allowable weight (e.g., α=allowable weight×gravitational acceleration), and pre-recorded in the memory 54.

At step S4, the CPU 52 notifies to a user that the weight of the workpiece W exceeds the allowable weight of the robot 12. As an example, the CPU 52 generates an image signal or an audio signal indicative of "The allowable weight is exceeded. Please assist the carry of the workpiece W".

Then, the CPU 52 outputs an image or sound to the user via a display or speaker (not shown) connected to the robot control device 50.

Figure 4:
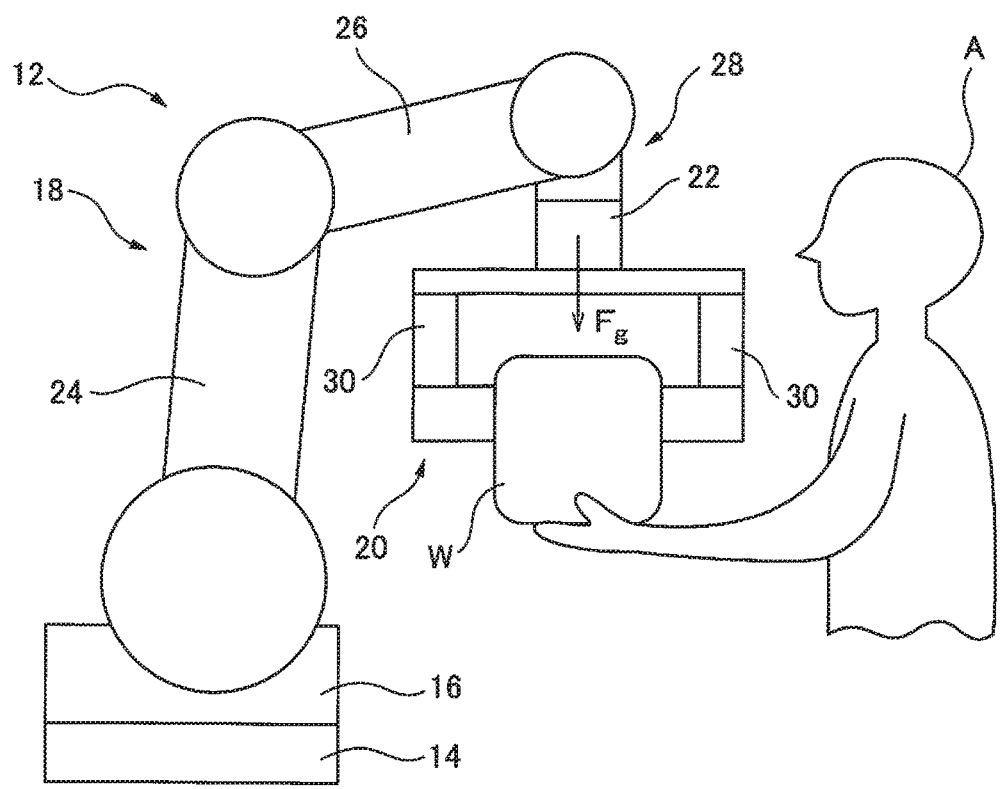
FIG. 4 shows a state in which the robot holds a workpiece in cooperation with a worker.

When the user recognizes that the allowable weight of the robot 12 is exceeded at step S4, the user supports the workpiece W with his hand from downward as shown in FIG. 4. In this case, the force component $F_g$ applied to the robot hand 20 sharply decreases as shown in FIG. 5.

Figure 5:
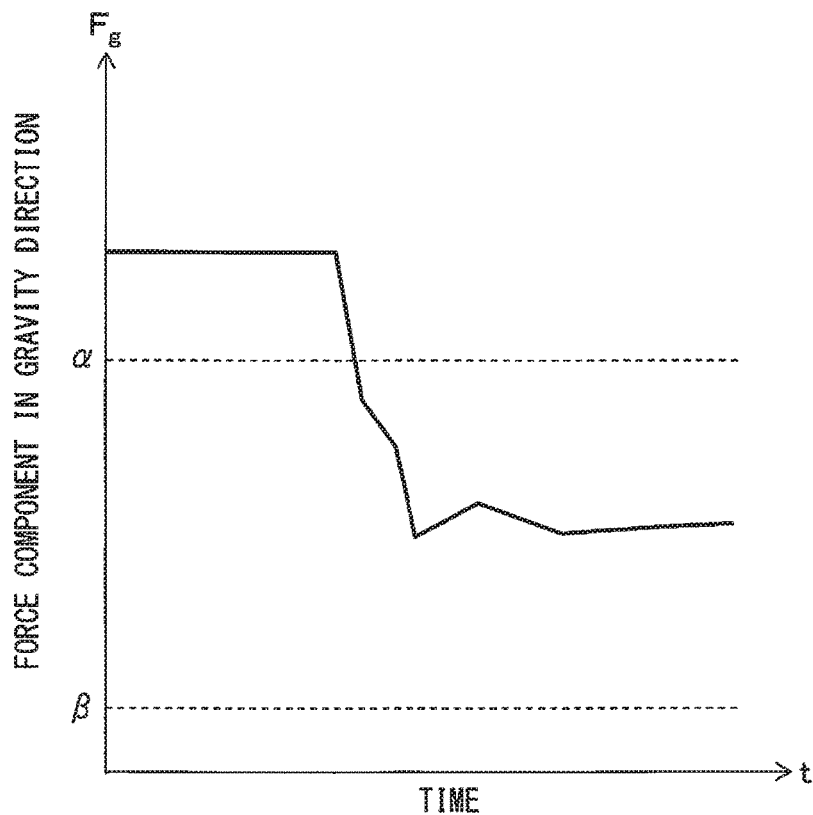
FIG. 5 is a graph representing an example of a characteristic of change in a force component in a gravity direction of a force acquired by a force acquisition part over time.

In this embodiment, the CPU 52 detects reduction of the force component $F_g$ as shown in FIG. 5 at step S5 described later, and starts to carry the workpiece W by the robot 12 at step S6 described later when detecting the reduction of the force component $F_g$.

At step S5, the CPU 52 determines whether the force component $F_g$ is smaller than or equal to the threshold value α. Specifically, the CPU 52 calculates the force component $F_g$ from the data of the force most-recently acquired by the force acquisition part 56.

When the force component $F_g$ is smaller than or equal to the threshold value α, the CPU 52 determines "YES", and proceeds to step S6. On the other hand, when the force component $F_g$ is greater than the threshold value α, the CPU 52 determines "NO", and returns to step S4 to notify to the user again that it is necessary to assist the carry of the workpiece W.

In this way, the CPU 52 can detect that the force component $F_g$ is reduced as shown in FIG. 5 by the worker A supporting the workpiece W.

At step S6, the CPU 52 operates the robot 12 so as to move the workpiece W in cooperation with the worker. In this embodiment, the CPU 52 generates an operation command to the robot 12 for carrying the workpiece W, in accordance with a robot program stored in the memory 54.

The CPU 52 sends the generated operation command to the servomotors 32 built in the robot 12. Thereby, the robot 12 operates in accordance with the robot program so as to carry the workpiece W from the place B to a predetermined target place in cooperation with the worker.

Thus, in this embodiment, the CPU 52 functions as the operation command part 62 which generates and sends the operation command to the robot 12 when the force component $F_g$ is smaller than or equal to the threshold value α.

The above-described robot program can be constructed by e.g. teaching the robot 12 a motion path thereof when it carries the workpiece W from the place B to the target place.

Figure 6:
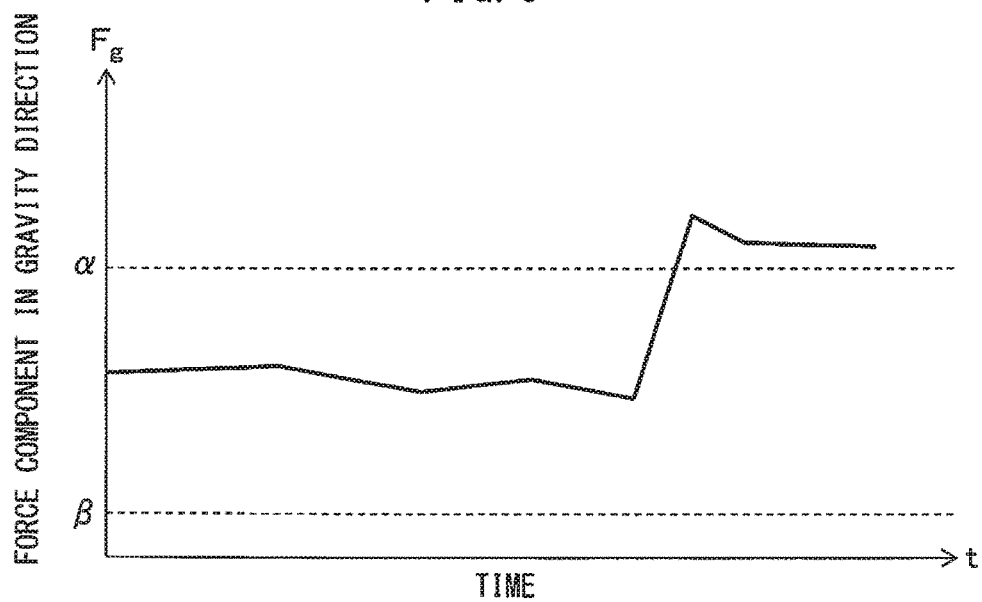
FIG. 6 is a graph representing an example of a characteristic of change in a force component in the gravity direction over time when a user releases his hand from a workpiece.

When the robot 12 carries the workpiece W in cooperation with the worker A at step S6, the worker A may abruptly get his hand off from the workpiece W. In this case, the force component $F_g$ sharply increases so as to exceed the threshold value α again, as shown in FIG. 6. In order to detect this, at the following step S7, the CPU 52 monitors whether the force component $F_g$ exceeds the threshold value α during carrying out step S6.

At step S7, the CPU 52 determines whether the force component $F_g$ of the most-recently acquired force F is greater than the threshold value α. Specifically, the CPU 52 calculates the force component $F_g$ of the force F most-recently acquired by the force acquisition part 56.

Then, the CPU 52 functions as the comparison part 58 so as to compare the calculated force component $F_g$ with the threshold value α. When the force component $F_g$ is greater than the threshold value α, the CPU 52 determines "YES", and proceeds to step S8. On the other hand, when the force component $F_g$ is smaller than or equal to the threshold value α, the CPU 52 determines "NO", and proceeds to step S9.

When determining "YES" at step S7, at step S8, the CPU 52 stops the operation of the robot 12. Specifically, the CPU 52 generates a command for stopping the servomotors 32 built in the robot 12, and send it to the servomotors 32. As a result, the operation of the robot 12 is stopped.

Thus, in this embodiment, the CPU 52 functions as the stop command part 60 which stops the robot 12 when the force component $F_g$ is greater than the threshold value α. After carrying out step S8, the CPU 52 returns to step S4, and notifies to the user again that it is necessary to assist the carry of the workpiece W.

When determining "NO" at step S7, at step S9, the CPU 52 determines whether the force component $F_g$ of the most-recently acquired force F is smaller than a threshold value β, or a force component $F_h$ in the horizontal direction of the most-recently acquired force F is greater than a threshold value γ.

Figure 7:
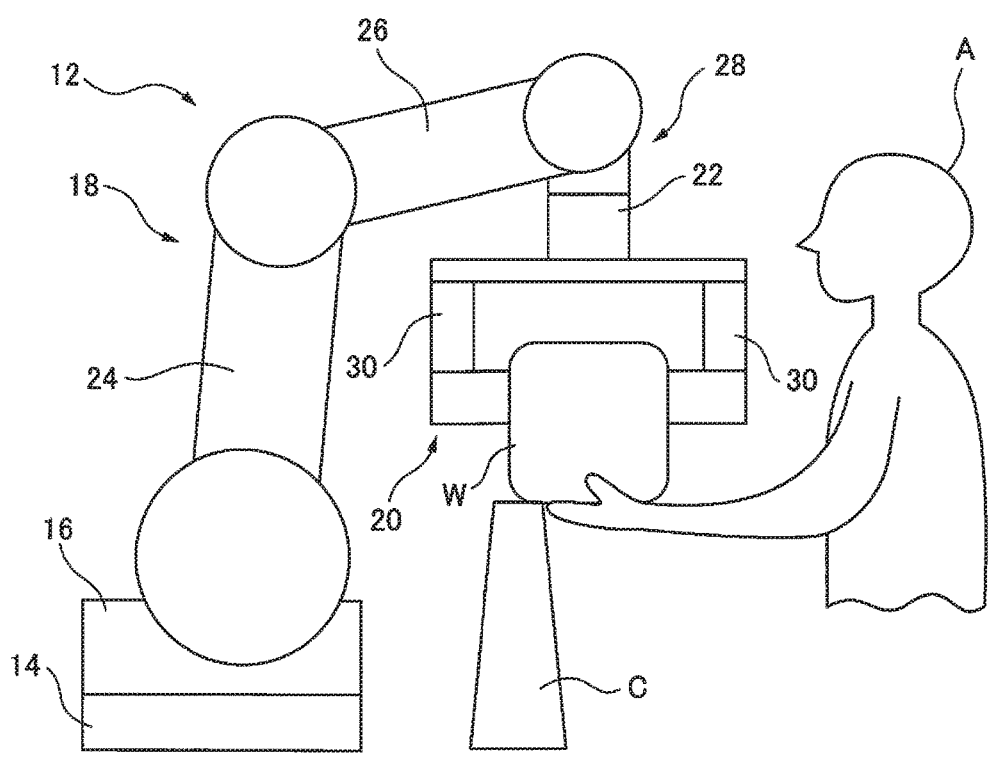
FIG. 7 shows a state in which an obstacle collides with a workpiece when a robot carries the workpiece in cooperation with a worker.

Step S9 is described below with reference to FIG. 7 to FIG. 10. When the robot 12 carries the workpiece W with the worker A at step S6, an obstacle C may collide with the workpiece W from downward, as shown in FIG. 7.

In this case, there is a risk that the worker A may get his body (e.g., a finger) caught between the obstacle C and the workpiece W (or the robot 12), thereby get injured. When the obstacle C collides with the workpiece W from downward as shown in FIG. 7, the force component $F_g$ sharply reduces as shown in FIG. 8.

Figure 9:
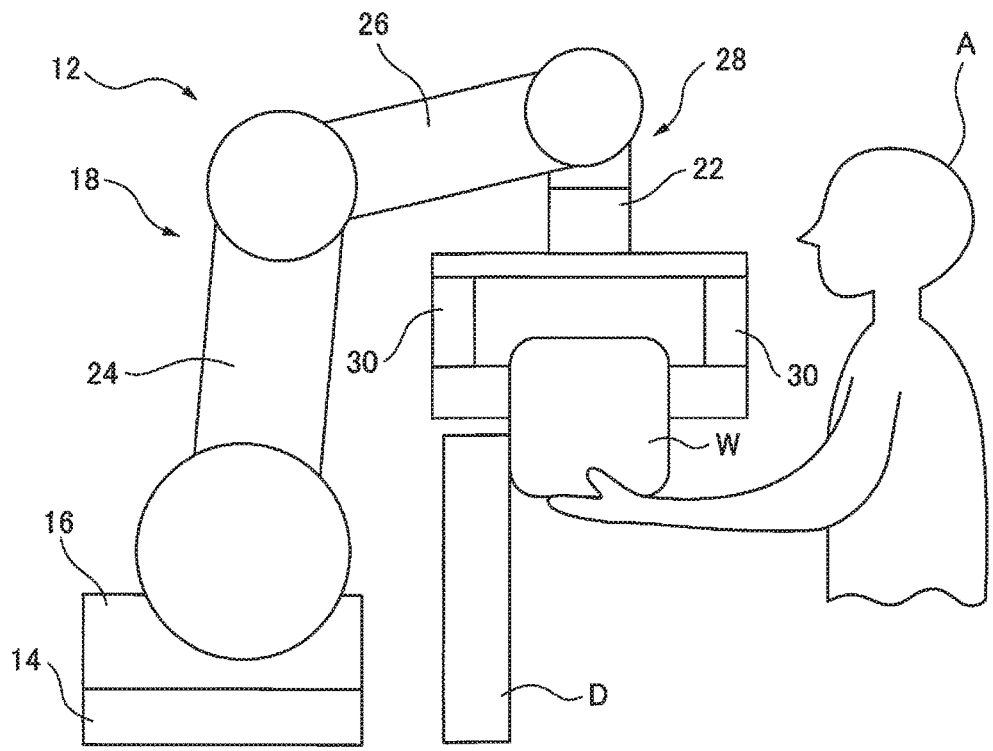
FIG. 9 shows a state in which an obstacle collides with a workpiece when a robot carries the workpiece in cooperation with a worker.

Further, when the robot 12 carries the workpiece W with the worker A at step S6, an obstacle D may collide with the workpiece W from lateral side as shown in FIG. 9. In this case also, there is a risk that the worker A may get his body caught between the obstacle D and the workpiece W (or the robot 12), thereby get injured.

Figure 10:
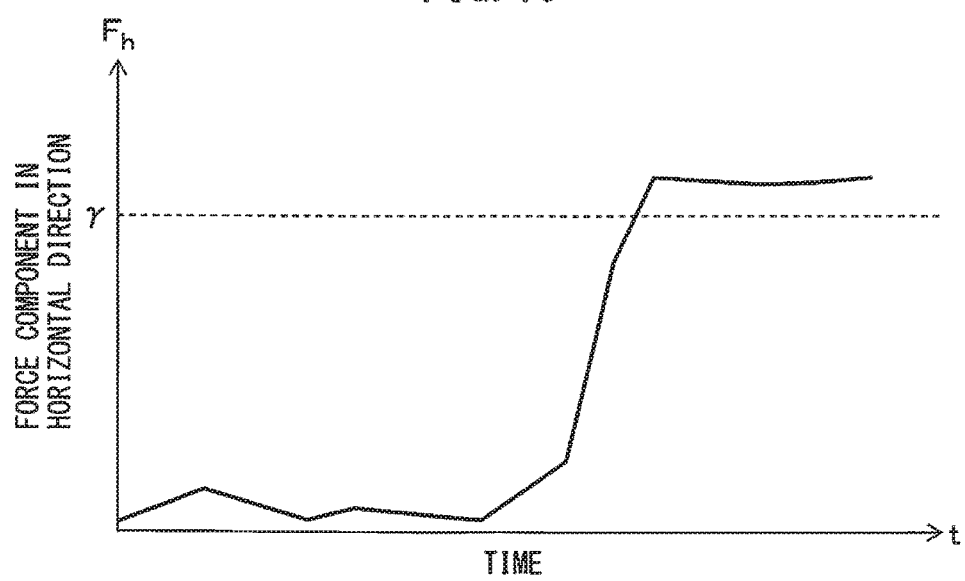
FIG. 10 is a graph representing an example of a characteristic of change in a force component in the horizontal direction over time when the obstacle collides with the workpiece from the lateral side thereof as shown in FIG. 9.

When the obstacle D collides with the workpiece W from lateral side as shown in FIG. 9, the force component $F_h$ in the horizontal direction of the force F applied from the workpiece W to the robot sharply increases as shown in FIG. 10.

Figure 8:
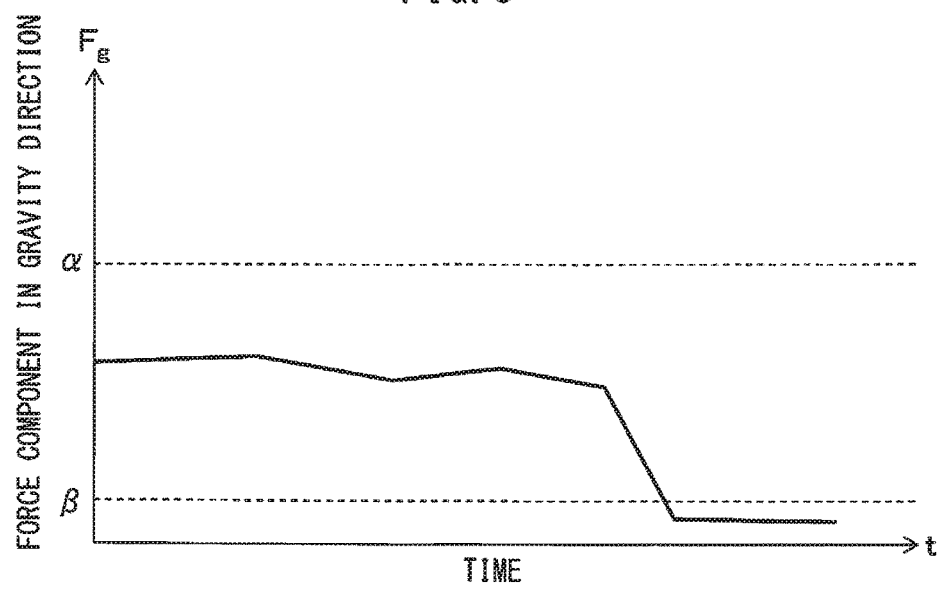
FIG. 8 is a graph representing an example of a characteristic of change in a force component in the gravity direction over time when the obstacle collides with the workpiece from downward thereof as shown in FIG. 7.

In this embodiment, in order to monitor reduction of the force component $F_g$ as shown in FIG. 8 and increase of the force component $F_h$ as shown in FIG. 10, at step S9, the CPU 52 determines whether the force component $F_g$ is smaller than the threshold value β, or the force component $F_h$ in the horizontal direction of the force F is greater than the threshold value γ.

Specifically, the CPU 52 calculates the force component $F_g$ of the force most-recently acquired by the force acquisition part 56. The CPU 52 determines whether the calculated force component $F_g$ is smaller than the threshold value β. The threshold value β is predetermined by the user so as to be smaller than the above-described threshold value α (i.e., α>β), and stored in the memory 54.

Further, the CPU 52 calculates the force component $F_h$ in the horizontal direction of the force F from the data of the force most-recently acquired by the force acquisition part 56. The CPU 52 determines whether the calculated force component $F_h$ is greater than the threshold value γ. The threshold value γ is predetermined by the user, and stored in the memory 54.

When the force component $F_g$ is smaller than the threshold value β (i.e., $F_g < \beta$), or the force component $F_h$ is greater than the threshold value γ (i.e., $F_h > \gamma$), the CPU 52 determines "YES", and proceeds to step S10.

On the other hand, when the force component $F_g$ is greater than or equal to the threshold value β (i.e., $F_g \geq \beta$), and the force component $F_h$ is smaller than or equal to the threshold value γ (i.e., $F_h \leq \gamma$), the CPU 52 determines "NO", and proceeds to step S11.

When having determined "YES" at step S9, at step S10, the CPU 52 stops the operation of the robot 12, similar as the above-described step S8, and ends the flow shown in FIG. 3.

On the other hand, when having determined "NO" at step S9, at step S11, the CPU 52 determines whether the workpiece W is carried to the target place. For example, the CPU 52 determines whether each servomotor 32 is appropriately driven to rotate by the number of rotations prescribed in the robot program, based on a signal from an encoder (not shown) installed at each servomotor 32.

When the CPU 52 determines that the workpiece W is carried to the target place (i.e., determines "YES"), it proceeds to step S12. On the other hand, when the CPU 52 determines that the workpiece W is not carried to the target place (i.e., determines "NO"), it returns to step S7.

At step S12, the CPU 52 sends a command to the servomotor 32 built in the robot hand 20 so as to open the fingers 30 to release the workpiece W gripped by them. In this way, the workpiece W is carried from the place B to the target place by the cooperation of the robot 12 and the worker A.

At step S13, the CPU 52 determines whether all of the workpieces W set by the user have been carried. When the CPU 52 determines that all of the workpieces W have been carried (i.e., determines "YES"), the CPU 52 ends the flow shown in FIG. 3. On the other hand, when the CPU 52 determines that there is one or more workpieces W to be carried (i.e., determines "NO"), the CPU 52 returns to step S2, and executes the operation for carrying another workpiece W.

As described above, in this embodiment, the CPU 52 monitors the force component $F_g$ applied from the workpiece W to the robot 12 during carrying out step S6, and stops the operation of the robot 12 when detecting that the allowable weight of the robot 12 is exceeded (i.e., when determining "YES" at step S7). According to this configuration, it is possible to carry various types of the workpieces W having various weights by the robot 12, along with preventing a load exceeding the allowable weight from being applied to the robot 12.

Further, according to this embodiment, it is possible to appropriately adjust a ratio of the weight to be carried by the robot 12 to the weight to be carried by the worker A, by appropriately setting the threshold value α within a range as far as the threshold value α is smaller than or equal to a value corresponding to the allowable weight. Accordingly, it is possible to flexibly meet a need for carrying a variety of the workpieces W.

Further, according to this embodiment, it is possible to carry not only the block-shaped workpiece W as shown in FIG. 1 but also workpieces W of various shapes (e.g., an elongate shape).

Further, in this embodiment, the CPU 52 monitors the force components $F_g$ and $F_h$ during carrying out step S6 so as to detect a collision between the obstacle C or D and the workpiece W during carrying the workpiece W (step S9), and immediately stops the robot 12 when the collision is detected. According to this configuration, it is possible to reliably prevent the worker A from being injured by the obstacle C or D during carrying the workpiece W.

Further, in this embodiment, when the CPU 52 detects that a load exceeding the allowable weight is applied to the robot 12 (when determining "YES" at step S3) after the robot 12 lifts up the workpiece W (step S2), the CPU 52 notifies the user of it. According to this configuration, the user can automatically and intuitively recognize that it is necessary to assist the carry of the workpiece W by the robot 12.

Further, when the CPU 52 determines "YES" at step S3, the CPU 52 does not start to carry the workpiece W by the robot 12 until it detects that the worker A supports the workpiece W (i.e., determines "YES" at step S5). According to this configuration, it is possible to reliably prevent a load exceeding the allowable weight from being applied to the robot 12.

Next, with reference to FIG. 11 to FIG. 14, another embodiment of an operation flow of the robot system 10 will be described. Note that, in the flow shown in FIG. 11, steps similar as those in the above-described FIG. 3 is assigned the same reference numerals, and the detail description thereof will be omitted.

In this embodiment, when the CPU 52 detects that the worker A supports the workpiece W (i.e., determines "YES" at step S5), the CPU 52 controls the robot 12 so as to carry the workpiece W in a direction of force applied to the workpiece W from the worker A.

Specifically, when having determined "YES" at step S5, the CPU 52 carries out the following steps S21 and S25 in parallel.

At step S21, the CPU 52 determines whether the force component $F_g$ of the most-recently acquired force F is greater than or equal to a predetermined threshold value δ. The threshold value δ is predetermined by the user so as to be smaller than the above-described threshold value α (i.e., α>δ), and stored in the memory 54.

When the force component $F_g$ is greater than or equal to the threshold value δ, the CPU 52 determines "YES" and proceeds to step S22. On the other hand, when the force component $F_g$ is smaller than the threshold value δ, the CPU 52 determines "NO" and proceeds to step S23.

Figure 12:
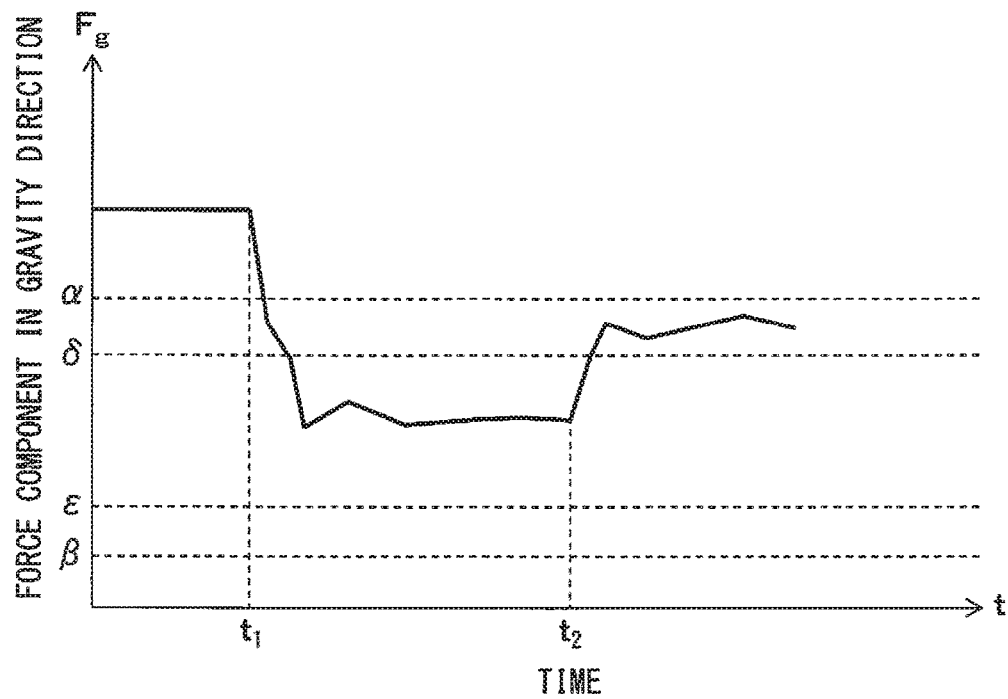
FIG. 12 is a graph representing an example of a characteristic of change in a force component in the gravity direction when it is determined "YES" at step S21 in FIG. 11.

FIG. 12 shows an example of a characteristic of change in the force component $F_g$ over time, when it is determined "YES" at step S21. In this example, the worker A supports the workpiece W from downward at a time point $t_1$, thereby the force component $F_g$ decreases at this time point $t_1$.

Then, the worker A slightly lowers his hands supporting the workpiece W in the gravity direction at a time point $t_2$ so as to reduce the force for supporting the workpiece W from downward. As a result, the force component $F_g$ sharply increases from the time point $t_2$, and subsequently falls within a range between the threshold values δ and α.

The CPU 52 detects such an operation of lowering the workpiece W by the worker A (i.e., the increase of the force component $F_g$), and moves the workpiece W by the robot 12 in the gravity direction so as to follow the lowering operation by the worker A at the following step S22.

At step S22, the CPU 52 operates the robot 12 so as to move the workpiece W in the gravity direction. Specifically, the CPU 52 generates an operation command for carrying the workpiece W in the gravity direction.

The CPU 52 sends the generated operation command to the servomotors 32 built in the robot 12. Thereby, the robot 12 moves the workpiece W in the gravity direction so as to follow the operation for lowering the workpiece W by the worker A.

On the other hand, when it is determined "NO" at step S21, at step S23, the CPU 52 determines whether the force component $F_g$ of the most-recently acquired force F is in a range between the above-described threshold value β and a threshold value ε (i.e., $ε≥F_g≥β$). The threshold value ε is predetermined by the user so as to be smaller than the threshold value β and greater than the threshold value β (i.e., α>ε>β), and stored in the memory 54.

When the force component $F_g$ is in the range between the threshold value β and the threshold value ε, the CPU 52 determines "YES" and proceeds to step S24. On the other hand, when the force component $F_g$ is out of the range between the threshold value β and the threshold value ε (i.e., $F_g$>ε or β>$F_g$), the CPU 52 determines "NO" and proceeds to step S7.

Figure 13:
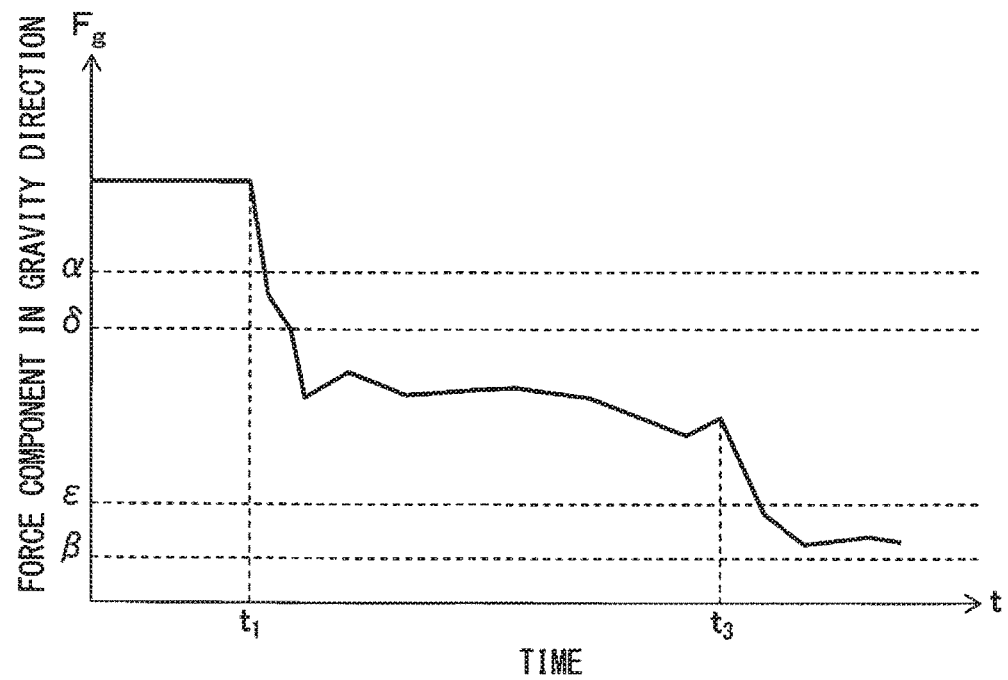
FIG. 13 is a graph representing an example of a characteristic of change in a force component in the gravity direction when it is determined "YES" at step S23 in FIG. 11.

FIG. 13 shows an example of a characteristic of change in the force component $F_g$ over time, when it is determined "YES" at step S23. In this example, the worker A supports the workpiece W from downward at the time point $t_1$, thereby the force component $F_g$ reduces at this time point $t_1$.

Then, at a time point $t_3$, the worker A lifts up the workpiece W in a vertically upper direction opposite to the gravity direction by a certain force, while he supports the workpiece W from downward. Due to this operation, the force component $F_g$ in the gravity direction of the force F detected by the force detection part 22 sharply decreases from the time point $t_3$, and subsequently falls within a range between the threshold value β and the threshold value ε.

The CPU 52 detects such an operation for lifting up the workpiece W by the worker A (i.e., the decrease of the force component $F_g$), and moves the workpiece W by the robot 12 in the vertically upper direction so as to follow the lifting up operation by the worker A at the following step S24.

At step S24, the CPU 52 operates the robot 12 so as to move the workpiece W in the vertically upper direction. Specifically, the CPU 52 generates an operation command for moving the workpiece W in the vertically upper direction.

The CPU 52 sends the generated operation command to the servomotors 32 built in the robot 12. Thereby, the robot 12 moves the workpiece W in the vertically upper direction so as to follow the operation of lifting up the workpiece W by the worker A.

At step S25, the CPU 52 determines whether the force component $F_h$ in the horizontal direction of the most-recently acquired force F is greater than or equal to a predetermined threshold value ζ. Specifically, the CPU 52 calculates the force component $F_h$ in the horizontal direction from the most-recently acquired force F, and determines whether the calculated force component $F_h$ is greater than or equal to the threshold value ζ. The threshold value ζ is predetermined by the user, and stored in the memory 54.

When the force component $F_h$ is greater than or equal to the threshold value ζ, the CPU 52 determines "YES" and proceeds to step S26. On the other hand, when the force component $F_h$ is smaller than the threshold value ζ, the CPU 52 determines "NO" and proceeds to step S7.

Figure 14:
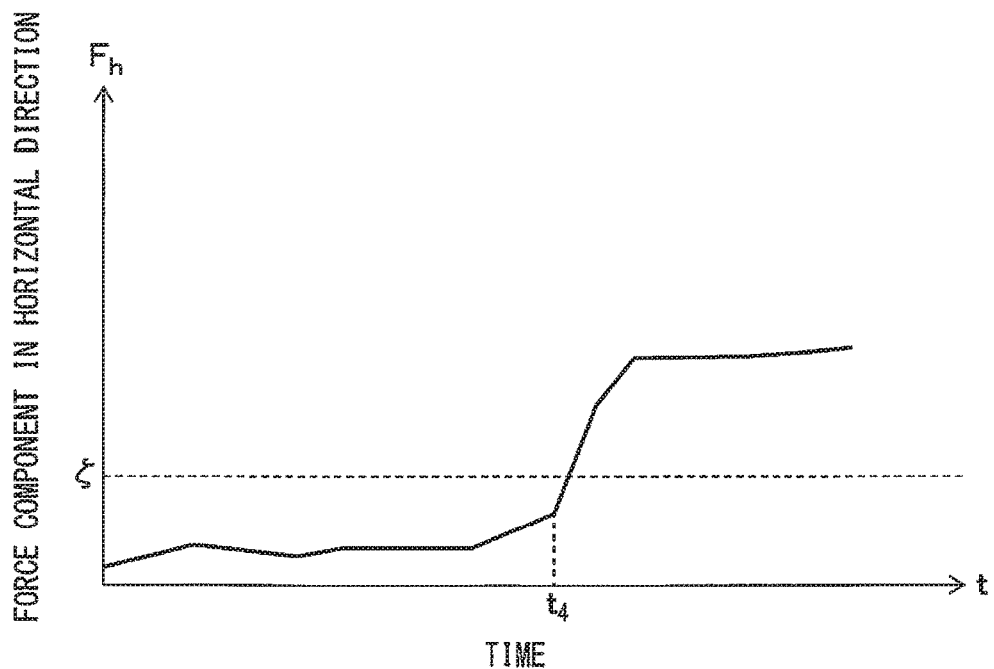
FIG. 14 is a graph representing an example of a characteristic of change in a force component in the horizontal direction when it is determined "YES" at step S25 in FIG. 11.

FIG. 14 shows an example of a characteristic of change in the force component $F_h$ over time, when it is determined "YES" at step S25. In this example, at a time point $t_4$, the worker A pushes the workpiece W in a direction intersecting with the gravity direction (e.g., the horizontal direction) while he supports the workpiece W, and thereby the force component $F_h$ sharply increases at this time point $t_4$.

In this embodiment, the CPU 52 detects such an operation by the worker A (i.e., the increase of the force component $F_h$), and moves the workpiece W by the robot 12 in the horizontal direction so as to follow the worker's operation at the following step S26.

At step S26, the CPU 52 operates the robot 12 so as to move the workpiece W in the horizontal direction. Specifically, the CPU 52 generates an operation command for moving the workpiece W in a direction of the force component $F_h$ calculated at step S25.

The CPU 52 sends the generated operation command to the servomotors 32 built in the robot 12. Due to this, the robot 12 moves the workpiece W in the direction of the force component $F_h$ so as to follow the worker's operation of pushing the workpiece W.

As described above, the CPU 52 executes steps S21 to S24 and steps S25 and 26 in parallel. If steps S22 and S26 are concurrently executed, the CPU 52 generates the operation command in the gravity direction and the operation command in the direction of the force component $F_h$, and sends them to the servomotors 32.

In this case, the operation of moving the workpiece W in the gravity direction and the operation of moving the workpiece W in the direction of the force component $F_h$ are combined, and the robot 12 can move the workpiece W in a direction of the force applied to the workpiece W from the worker A.

In this embodiment, when the force component $F_g$ is smaller than or equal to the threshold value α the CPU 52 generates an operation command for carrying the workpiece W based on a magnitude and a direction of the force F acquired by the force acquisition part 56, and sends the operation command to the robot 12.

According to this configuration, the worker A can carry the workpiece W in a desired direction in cooperation with the robot 12 while preventing a load exceeding the allowable weight from being applied to the robot 12. Accordingly, it is possible to smoothly carry the workpiece W.

Note that, at the above-described step S26, the CPU 52 may control a speed for carrying the workpiece W by the robot 12 in response to a magnitude of the force component $F_h$. For example, the CPU 52 may generate the operation command to the robot 12 so as to move the workpiece W at a speed proportional to the magnitude of the force component $F_h$.

Further, in the above-described steps S21, S23, and S25, the CPU 52 may calculate a degree of change in the force components $F_g$ and $F_h$ with respect to time (e.g., a gradient=δF/δt), and compare the calculated degree of change with a threshold value set for the degree of change.

For example, the CPU 52 may execute step S22 when it detects increase of the gradient of the force component $F_g$ at the time point $t_2$ as shown in FIG. 12. Further, the CPU 52 may execute step S24 when it detects decrease of the gradient of the force component $F_g$ at the time point $t_3$ as shown in FIG. 13.

Figure 11:
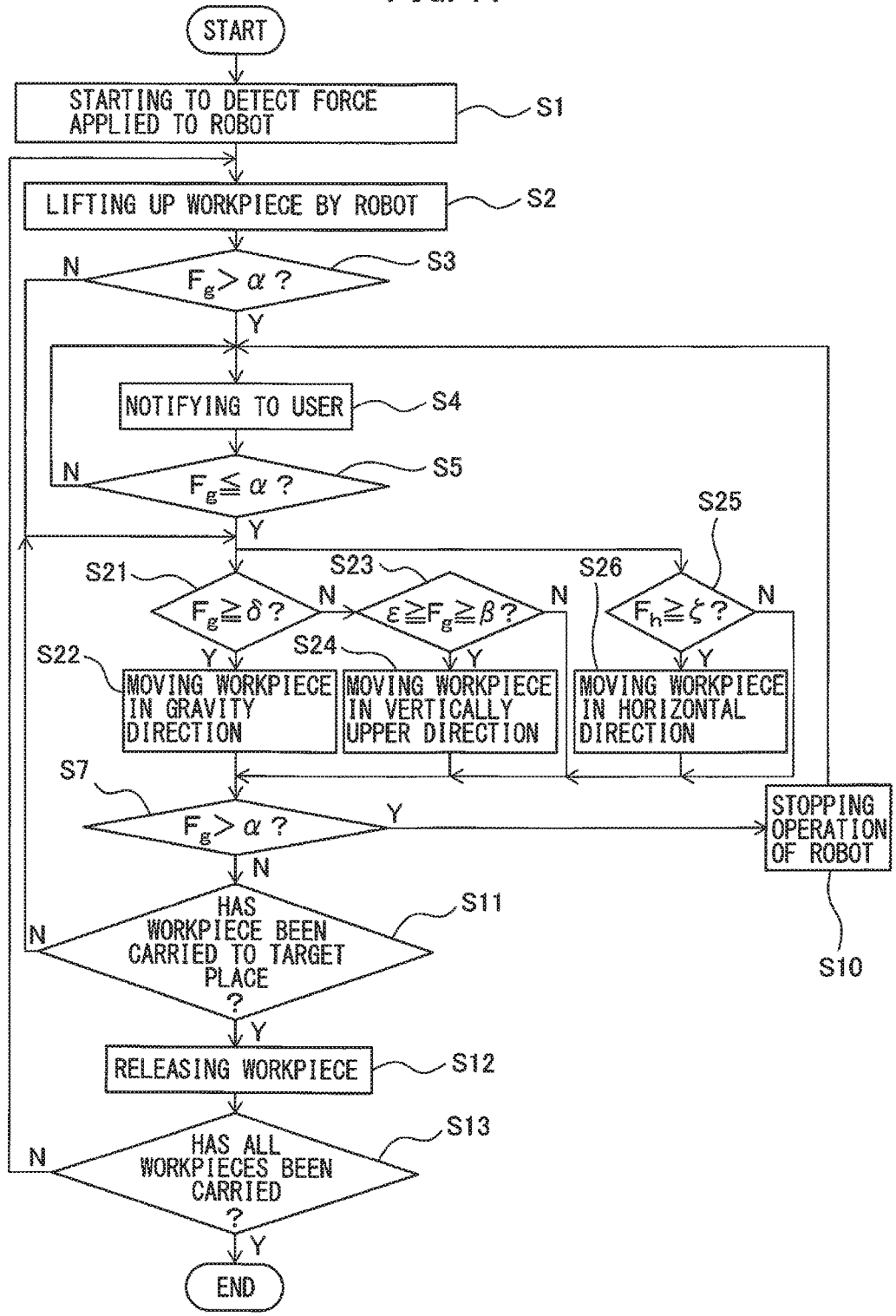
FIG. 11 shows another example of an operation flow of the robot system shown in FIG. 1.

Further, in the flow shown in FIG. 11, an emergency stop scheme as steps S9 and S10 shown in FIG. 3 may be introduced. In this case, the CPU 52 may stop the robot 12 when the degree of change in the force component $F_g$ or $F_h$ with respect to time exceeds a predetermined threshold value, i.e., when the force component $F_g$ or $F_h$ abnormally increases or decreases.

The force detection part 22 may be mounted at any portion of the robot 12, such as the revolving drum 16, the robot arm 18, or the robot hand 20.

Although the invention is described above through the embodiments, the above-described embodiments do not limit the above-described invention to the scope of claims. Further, embodiments in which the features described in the embodiments of the invention are combined can be included in the technical scope of the invention, but all of combinations of the features are not always essential to the means for solution according to the invention. Further, it will be obvious for a person skilled in the art that the above-described embodiments can be variously modified or improved.

Further, it is to be noted that the execution order of each processing of the operations, procedures, steps, processes, stages and the like in the apparatus, system, program, and method described in the scope of claims, the specification, and the drawings are not especially and expressly described as "previous to", "prior to", and the like and can be realized in an arbitrary order as long as an output of former processing is not used in latter processing. Regarding the scope of claims, the specification, and the operation flows in the drawings, if "first,", "next,", "then", "subsequently" or the like are used in the description for convenience sake, this does not mean that the implementation in this order is essential.

The invention claimed is:

1. A robot control device for controlling a robot to carry an object in cooperation with a person, the robot control device comprising:
   a force acquisition part configured to acquire a force applied from the object to the robot when the robot lifts up the object and before the robot starts an object-carrying operation of carrying the object;
   a comparison part configured to compare a force component in a gravity direction of the force acquired by the force acquisition part with a first threshold value predetermined with respect to the force component;
   a stop command part configured to maintain the robot in a stopped state so as not to start the object-carrying operation in response to the force component being greater than the first threshold value; and
   an operation command part configured to, in response to the force component being smaller than or equal to the first threshold value, generate an operation command to the robot for carrying the object and transmit the operation command to the robot so as to start the object-carrying operation,
   wherein, after the operation command part starts the object-carrying operation,
      the force acquisition part is configured to acquire a new force applied from the object to the robot,
      the comparison part is configured to compare a force component in the gravity direction of the new force acquired by the force acquisition part with the first threshold value, and
      the stop command part is configured to stop the object-carrying operation in response to the force component of the new force being greater than the first threshold value.

2. The robot control device according to claim 1, wherein the operation command part is configured to generate the operation command to the robot for carrying the object in a direction opposite to the gravity direction, in response to the force component of the new force being smaller than or equal to a second threshold value which is smaller than the first threshold value.

3. The robot control device according to claim 1, wherein the operation command part is configured to generate the operation command to the robot for carrying the object in the gravity direction, in response to the force component of the new force being (i) smaller than or equal to the first threshold value and (ii) greater than or equal to a second threshold value which is smaller than the first threshold value.

4. The robot control device according to claim 1, wherein the stop command part is configured to stop the robot in response to the force component of the new force being smaller than a second threshold value which is smaller than the first threshold value.

5. The robot control device according to claim 1, wherein the operation command part is configured to generate the operation command to the robot for carrying the object in a direction intersecting with the gravity direction, in response to a force component in the direction intersecting with the gravity direction of the new force acquired by the force acquisition part.

6. The robot control device according to claim 5, wherein the stop command part is configured to stop the robot when the force component in a horizontal direction of the new force acquired by the force acquisition part is greater than a threshold value predetermined with respect to the force component in the horizontal direction.

7. A robot system comprising:
   a robot; and
   a robot control device according to claim 1 configured to control the robot,
   wherein the robot includes a force detection part configured to detect a force applied from an object to the robot when the robot lifts up the object.

8. A method of controlling a robot to carry an object in cooperation with a person, the method comprising:
   detecting a force applied from the object to the robot when the robot lifts up the object and before the robot starts an object-carrying operation of carrying the object;
   comparing a force component in a gravity direction of the detected force with a threshold value predetermined with respect to the force component;
   maintaining the robot in a stopped state so as not to start the object-carrying operation in response to the force component being greater than the threshold value;
   in response to the force component being smaller than or equal to the threshold value, generating an operation command to the robot for carrying the object, and transmitting the operation command to the robot so as to start the object-carrying operation; and
   after starting the object-carrying operation,
      acquiring a new force applied from the object to the robot,
      comparing a force component in the gravity direction of the acquired new force with the threshold value, and
      stopping the object-carrying operation in response to the force component of the new force being greater than the threshold value.

9. The robot control device according to claim 1, wherein the robot control device is configured to generate a notification to the person in response to the force component in the gravity direction being greater than the first threshold value.

10. The robot control device according to claim 9, wherein the force acquisition part is configured to acquire a new force applied from the object to the robot after a predetermined time period from the notification to the person.

11. The robot control device according to claim 1, wherein when the robot carries the object in cooperation with the person and the person abruptly gets his or her hand off the object causing the force component to sharply increase so as to exceed the first threshold value, the stop command part is configured to generate a command for stopping a servomotor built in the robot and send the command to the servomotor so that the object-carrying operation of the robot is stopped.

12. The robot control device according to claim 4, wherein
when the robot carries the object in cooperation with the person and an obstacle collides with the object from below causing the force component to sharply decrease so as to be smaller than the second threshold value, the stop command part is configured to generate a command for stopping a servomotor built in the robot and send the command to the servomotor so that the object-carrying operation of the robot is stopped.

* * * * *